(No Model.)

G. L. MOORE & C. JORY.
GRAPE PICKER.

No. 477,952. Patented June 28, 1892.

Witnesses:
Elihu B. Stowe.
James T. Summerville.

Inventors:
George L. Moore and
Chas. Jory.
By Joshua B. Webster Atty.

UNITED STATES PATENT OFFICE.

GEORGE L. MOORE AND CHARLES JORY, OF STOCKTON, CALIFORNIA, ASSIGNORS TO WOODSON T. HARRIS, OF SAME PLACE.

GRAPE-PICKER.

SPECIFICATION forming part of Letters Patent No. 477,952, dated June 28, 1892.

Application filed November 27, 1891. Serial No. 413,298. (No model.)

*To all whom it may concern:*

Be it known that we, GEORGE L. MOORE and CHARLES JORY, citizens of the United States, residing at Stockton, in the county of San Joaquin and State of California, have invented certain new and useful Improvements in Grape-Pickers; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention has relation to an improvement in devices for cutting grapes from the vine and holding the cut bunches so that they may be delivered into a basket, box, or other receptacle without handling them.

The invention will be fully understood from the following description and claims when taken in connection with the annexed drawings, in which—

Figure 1:
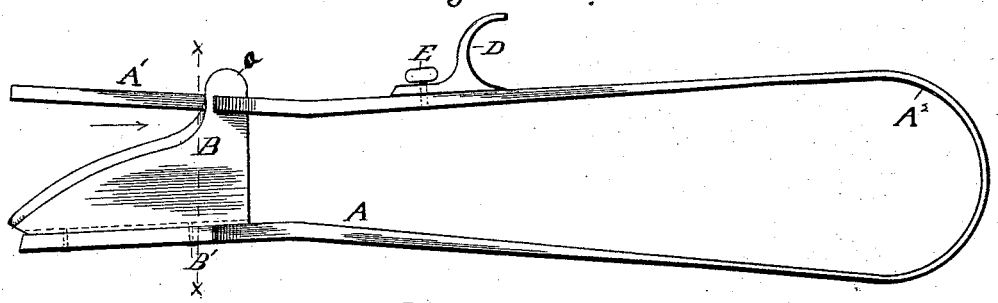
Figure 2:
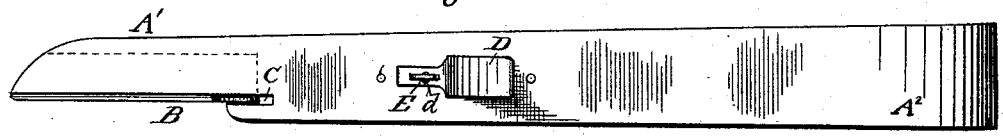
Figure 3:
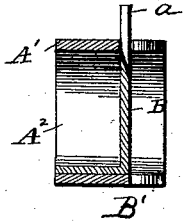

Figure 1 is an edge or side view of our improved device. Fig. 2 is a plan view of the same, and Fig. 3 is a cross-sectional view taken in the plane indicated by the dotted line $xx$ on Fig. 1.

In carrying out our invention we take a bar A of flat spring-steel other suitable material of a sufficient length and width and cut away one edge of each end, as better shown in Fig. 2 of the drawings, so as to form two jaws A' and B'. We then take a cutter B of a form substantially as shown in Figs. 1 and 2 and secure it to the inner side at the cut-away edge of one end of the bar or strip by rivets or other suitable means. We then temper the bar at a point midway of its length, where it is thinned, as shown at $A^2$, after which we bend the same into a looped form, so as to form two spring branches, and we bend or curve the branches at a short distance from their ends, as better shown in Fig. 1 of the drawings, so that the jaws A' and B' may come flat together when the branches are pressed by the thumb and fingers. At the base of the cut-away portion of the jaw A' we form a guide-slot C, and the cutter B has an extension $a$, which is designed to enter said slot so as to guide the movements of the jaw A', which latter jaw serves in connection with the cutter to sever the twig or branch.

D indicates a thumb-piece. This thumb-piece is arranged on the branch of the jaw A' and on the outer side thereof. This thumb-piece, which is curved to receive the thumb, is provided with a hole $d$, and a set-screw E is employed to secure said thumb-piece to the branch of the jaw A', said branch being provided with one or more holes whereby the thumb-piece may be adjustably secured thereto. It will be observed that the cutter B assumes a position in a plane relatively at right angles to the jaw B' and is secured at the cut-away portion thereof, so that the jaws, when pressed together, may bear flat upon each other.

In operation the device is taken in the hand with the thumb against the piece D. The twig or branch to be cut is then received between the cutter and the jaw A', and it is obvious that before the twig or branch will be entirely severed the jaws which project laterally from the cutter will have pressed sufficiently upon the stem, so as to hold the bunch as it is severed, and such hold may be retained by keeping the thumb and fingers pressed upon the branches of the device until the cut bunch has been placed in a basket or other receptacle.

This device is very effective for the purposes described. It is very durable, may be easily manufactured, and there are no joints or such parts about it that may get out of order.

Having described our invention, what we claim is—

1. As an improved article of manufacture, the grape-cutter described, composed of the strip of steel or other suitable material having the edges at opposite ends cut-away and a cutter secured to one of said cut away ends on the inner side thereof, so as to form lateral jaws on one side of the cutter, whereby a bunch of grapes may be held after being cut, substantially as specified.

2. The grape-cutter described, composed of a bar or strip of steel or other material thinned or tempered at or about midway of its length and looped so as to form a finger branch and a thumb branch, each branch being cut away at its terminal end on corresponding edges and one branch having the slot at the base of its cut-away portion, a cutter secured to one of the jaws or branches and having an extension to enter the slot in the opposite branch, and a thumb-piece secured to the outer side of one of the branches, substantially as specified.

In testimony whereof we affix our signatures in presence of two witnesses.

GEORGE L. MOORE.
CHARLES JORY.

Witnesses:
JOSHUA B. WEBSTER,
JAMES T. SUMMERVILLE.

Correction in Letters Patent No. 477,952.

It is hereby certified that Letters Patent No. 477,952, granted June 28, 1892, upon the application of George L. Moore and Charles Jory, of Stockton, Caliafornia, for an improvement in "Grape Pickers," were erroneously issued to Woodson T. Harris, as sole owner of the said invention; that said Letters Patent should have been issued to said *George L. Moore and Woodson T. Harris, jointly*, said Harris being assignee of the interest of said Charles Jory only, as shown by the record of assignments in this Office; and that said Letters Patent should be read with this correction therein that the same may conform to the record of the case in the Patent Office.

Signed, countersigned, and sealed this 2d day of August, A. D. 1892.

[SEAL.]

CYRUS BUSSEY,
*Assistant Secretary of the Interior.*

Countersigned:
  N. L. FROTHINGHAM,
    *Acting Commissioner of Patents.*